United States Patent
Kuroiwa et al.

(10) Patent No.: US 7,913,831 B2
(45) Date of Patent: *Mar. 29, 2011

(54) INTELLIGENT CASH BOX SYSTEM AND METHOD FOR TRANSMITTING CODE INFORMATION

(75) Inventors: Koji Kuroiwa, Sagamihara (JP); Taichi Sato, Sagamihara (JP); Toru Seki, Sagamihara (JP)

(73) Assignee: Japan Cash Machine Co., Ltd., Osaka (JP)

( * ) Notice: Subject to any disclaimer, the term of this patent is extended or adjusted under 35 U.S.C. 154(b) by 343 days.

This patent is subject to a terminal disclaimer.

(21) Appl. No.: 11/375,165

(22) Filed: Mar. 13, 2006

(65) Prior Publication Data

US 2006/0151281 A1 Jul. 13, 2006

Related U.S. Application Data

(63) Continuation of application No. 10/702,533, filed on Nov. 5, 2003.

(30) Foreign Application Priority Data

Nov. 6, 2002 (JP) ................................. 2002-322463

(51) Int. Cl.
G07D 7/00 (2006.01)
(52) U.S. Cl. ...................................................... 194/207
(58) Field of Classification Search .................. 194/206, 194/207, 302, 350, 215, 216, 217; 235/375, 235/379, 380, 385; 463/25, 43, 44, 45; 271/145; 273/138.2; 109/38; 340/5.86; 700/225, 236

See application file for complete search history.

(56) References Cited

U.S. PATENT DOCUMENTS

| | | | | | |
|---|---|---|---|---|---|
| 4,780,601 | A | * | 10/1988 | Vermesse | 235/375 |
| 5,491,326 | A | * | 2/1996 | Marceau et al. | 235/381 |
| 5,662,202 | A | * | 9/1997 | Suris | 194/206 |
| 5,743,429 | A | * | 4/1998 | Morofsky | 221/7 |
| 5,907,141 | A | * | 5/1999 | Deaville et al. | 235/375 |
| 6,059,090 | A | * | 5/2000 | Davis et al. | 194/350 |
| 6,078,877 | A | * | 6/2000 | Fujii et al. | 702/188 |
| 6,845,905 | B2 | * | 1/2005 | Blad et al. | 235/375 |
| RE38,812 | E | * | 10/2005 | Acres et al. | 463/26 |

* cited by examiner

*Primary Examiner* — Stefanos Karmis
*Assistant Examiner* — Mark J Beauchaine
(74) *Attorney, Agent, or Firm* — Bachman & LaPointe, P.C.

(57) ABSTRACT

An intelligent cash box system is provided which comprises: a validator 2 attached in a bill handling apparatus 1; a detection sensor 45 mounted in validator 2; a control circuit 47 connected to detection sensor 45; a card 3 bearing at least a code recorded on card 3 for identifying bill handling apparatus 1; a stacker 4 attached to validator 2 for accumulating bills 44 considered as genuine by validator 2; and an intelligent storage 5 provided in stacker 4. The card 3 can be inserted into validator 2 so that detection sensor 45 detects the code on card 3 and bill information on bill 44, and forwards the code and bill information to control circuit 47 which then transmits the code and bill information to intelligent storage 5 for storage therein. The code information identifies bill handling apparatus 1 from which stacker 4 is removed, and the bill information enables to collate an amount of collected bills in a plurality of stackers 4 with an amount of bills considered genuine and stored in stackers 4 without connection of validator 2 to any control host computer.

27 Claims, 12 Drawing Sheets

PRIOR ART

PRIOR ART

PRIOR ART

PRIOR ART

INTELLIGENT CASH BOX SYSTEM AND METHOD FOR TRANSMITTING CODE INFORMATION

CROSS REFERENCE TO RELATED APPLICATION

This application is a continuation application of co-pending application Ser. No. 10/702,533 which was filed on Nov. 5, 2003 entitled BILL HANDLING APPARATUS AND METHOD FOR TRANSMITTING CODE INFORMATION, By Koji Kuroiwa et al.

TECHNICAL FIELD

The present invention relates to bill handling technology, in particular, an intelligent cash box system and a method for transmitting code information for identifying a bill handling apparatus from which a stacker is recovered.

BACKGROUND OF THE INVENTION

For example, U.S. Pat. No. 5,630,755 issued to Michael Walsh discloses a soft count tracking system for a currency operated host gaming machine. This soft count tracking system comprises an identification adapter provided with an integral active electronic component adapted to store a unique serial number, means for placing the identification adapter in data communication with the host machine, a currency note validator with microcontroller, means for placing the currency note validator in data communication with the identification adapter for interrogating the identification adapter for identification number, a storage mechanism that includes integral nonvolatile storage memory means, and means for placing the storage mechanism in data communication with the currency note validator thereby to receive and hold information from the identification adapter, and a soft count supervisor adapted to be placed in detachable data communication with the memory means to interrogate and extract data from the same. The soft count supervisor comprises a computer, including software means to provide spread sheet data manipulation of the data extracted from the memory means. This system, however, is disadvantageous in that it involves a complicated structural system that may sometimes induce malfunction because the system requires an on-line connection of a host computer, a validator and a stacker to transfer necessary information therebetween via conversion software.

An object of the present invention is to provide an intelligent cash box system and a method for transmitting code information for identifying a bill handling apparatus from which a stacker is recovered. Another object of the present invention is to provide an intelligent cash box system and a method for transmitting bill information capable of collating an amount of collected bills in a plurality of stackers with an amount of bills considered genuine and stored in the stackers without connection of the validators to any control host computer. Still another object of the present invention is to provide an intelligent cash box system that comprises a validator and a stacker removably attached to the validator to transmit necessary information from a control circuit in the validator to an intelligent storage in the stacker in non-contact communication between the control circuit and intelligent storage.

SUMMARY OF THE INVENTION

An intelligent cash box system according to the present invention comprises: validating means (2) attached in a bill handling apparatus (1); sensing means (45) mounted in the validating means (2); control means (47) connected to the sensing means (45); a card (3) bearing at least a code recorded on the card (3) for identifying the bill handling apparatus (1); stacking means (4) attached to the validating means (2) for accumulating bills (44) considered as genuine by the validating means (2); and an intelligent storage (5) provided in the stacking means (4). The card (3) can be inserted into the validating means (2) so that the sensing means (45) detects the code on the card (3) and bill information on the bill (44), and forwards the code and bill information to the control means (47) which then transmits the code and bill information to the intelligent storage (5) for storage therein. The code information identifies the bill handling apparatus (1) from which the stacking means (4) is removed, and the bill information enables to collate an amount of collected bills in a plurality of the stacking means (4) with an amount of bills (44) considered genuine and stored in the stacking means (4) without connection of the validating means (2) to any control host computer.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Figure 1:
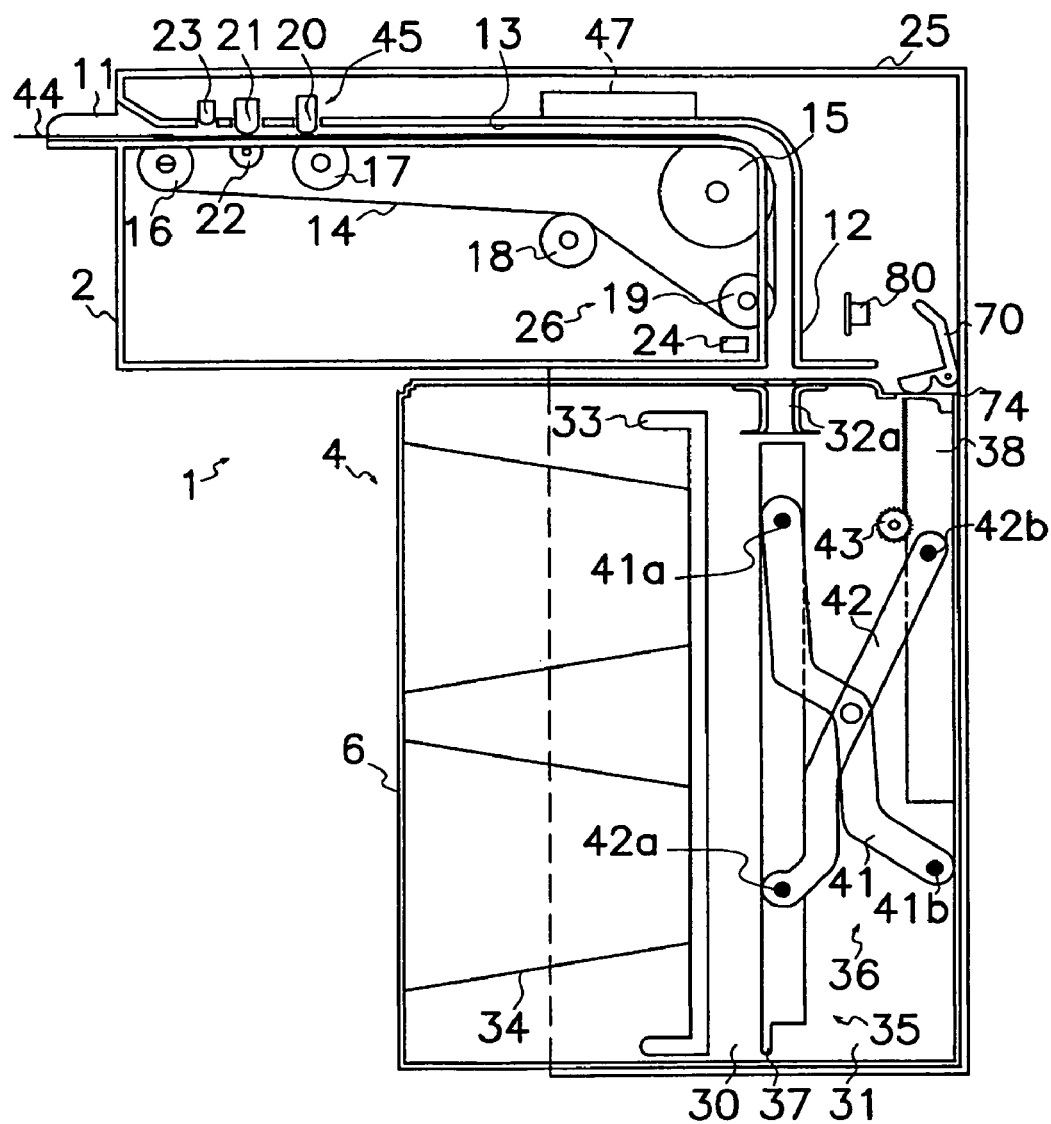
FIG. 1 is a sectional view of a prior art bill handling apparatus.
Figure 2:
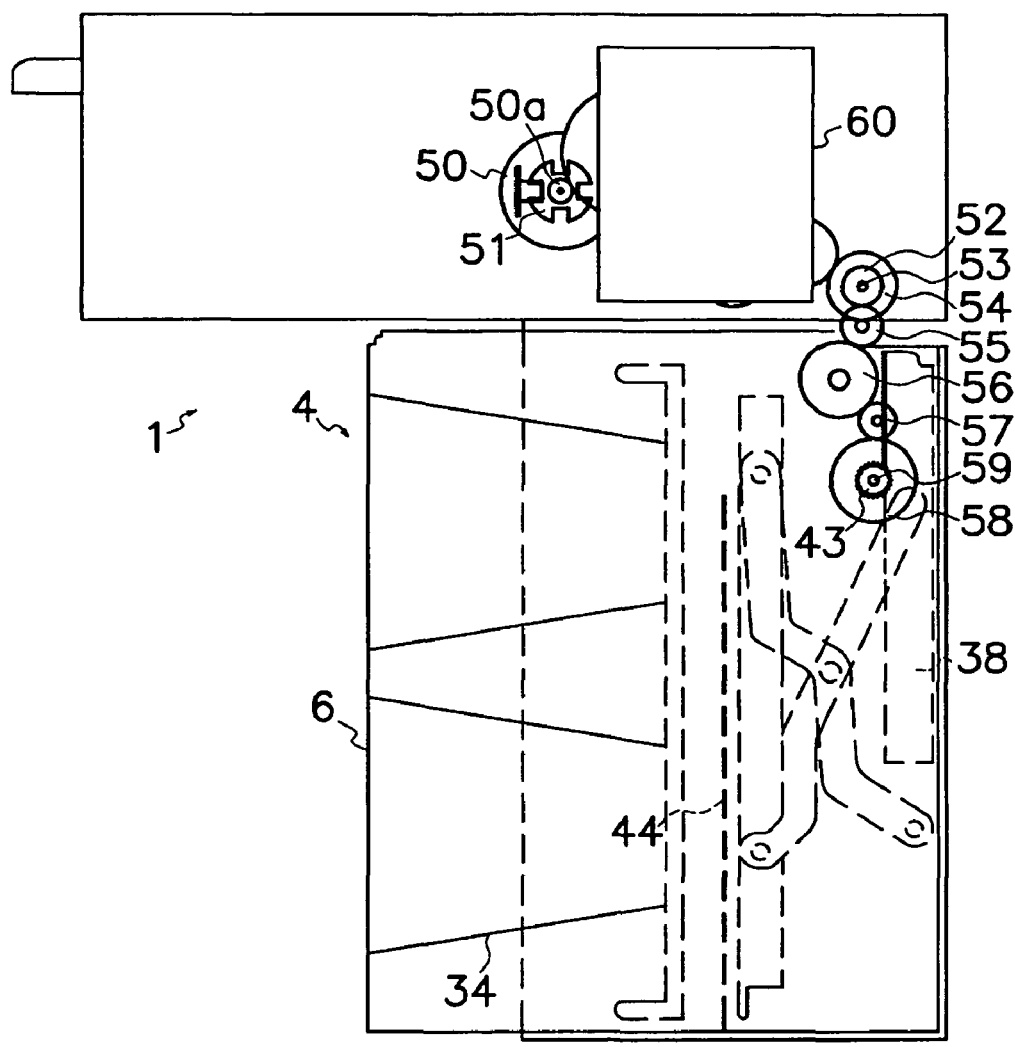
FIG. 2 is a sectional view of drive mechanism in the bill handling apparatus shown in FIG. 1.

As shown in FIG. 1, a prior art bill handling apparatus 1 comprises a validator 2 provided with an inlet 11 into which a bill 44 is inserted, and a stacker 4 defining a storage chamber 30 for accumulating bills 44 considered genuine by validator 2. Validator 2 comprises a convey device 26 for transporting bill 44 inserted from inlet 11 along a generally L-shaped passageway 13 extending from inlet 11 to an outlet 12, and a control circuit 47 provided in validator 2 for supplying convey device 26 with drive signals. Convey device 26 and control circuit 47 provided in validator 2 are disposed in an L-shaped frame 25 made of metallic panels. Convey device 26 comprises convey belts 14 for transporting bill 44 along passageway 13, and drive pulleys 15 for driving convey belts 14, and a plurality of idle rollers 16 to 19 for supporting convey belts 14.

Provided in the vicinity of passageway 13 is a detection sensor 45 that comprises an optical sensor 20 for detecting an optical feature of bill 44 moving along passageway 13, and a magnetic sensor 21 for detecting a magnetic feature of bill 44. A pinch roller 22 is positioned opposite to the magnetic sensor 21 to push bill 44 toward magnetic sensor 21. Inlet sensor 23 located at inlet 11 detects insertion of bill 44 into inlet 11. An outlet sensor 24 located at outlet 12 detects discharge of bill 44 from validator 2. For example, each of inlet sensor 23 and outlet sensor 24 comprises photocoupler of light emitting diode and photo-transistor, and optical sensor 20 comprises photocoupler of infrared ray emitting diode and photo-transistor.

Removably attached to a bottom of validator 2 is portable or mobile stacker 4 that, as illustrated in FIG. 1, comprises a cash box 6 formed with a storage chamber 30 and a housing 31. Storage chamber 30 receives a back plate 33 and a compression spring 34 for resiliently urging back plate 33 toward housing 31. A pusher 35 is mounted in housing 31 to press supplied bill 44 into cash box 6. Pusher 35 comprises a push plate 37 for pressing bill 44 into storage chamber 30, a link mechanism 36 connected to push plate 37 at the one end for driving push plate 37, and a rack 38 connected to the other end of link mechanism 36. Link mechanism 36 comprises a pair of links 41, 42 connected to each other to form an X shape. Link 41 has one end 41a rotatably connected to push plate 37 and the other end 41b rotatably connected to cash box 6. Link 42 has one end 42a rotatably connected to push plate 37 and the other end 42b rotatably connected to rack 38 that is meshed with a pinion 43 driven by a convey motor 50 provided in validator 2.

Connected to output shaft of convey motor 50 is a rotary encoder 51 that produces pulse signals in response to rotation of convey motor 50 to count the pulse signals from rotary encoder 51 by any pulse detector (not shown) in order to determine the moved position of bill 44 along passageway 13. Output gear 50a mounted on output shaft of convey motor 50 is drivingly connected to a first gear 52 mounted on a first shaft 53 through a reduction device 60. A second gear 54 mounted on first shaft 53 is engaged with a third gear 55 protruded from validator 2. Third gear 55 is drivingly connected to a sixth gear 58 through fourth and fifth gears 56 and 57. A sixth gear 58 has a pinion shaft 59 on which pinion 43 is mounted.

Figure 3:
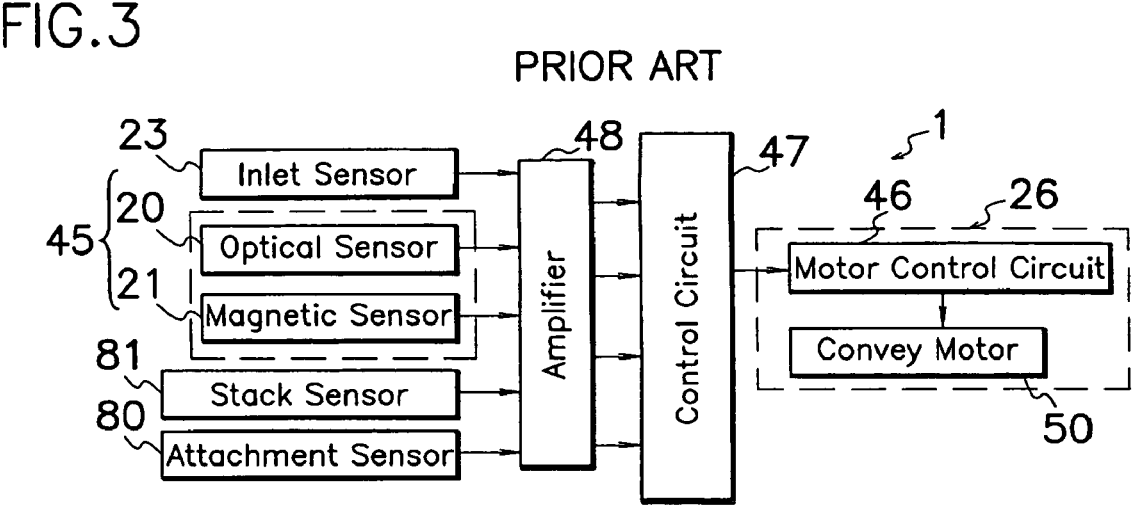
FIG. 3 is an electric circuit used in the bill handling apparatus shown in FIG. 1.

Accordingly, when convey motor 50 is rotated in one direction, rack 38 is upwardly moved as shown in FIG. 3 to the upward position, while push plate 37 is moved away from a channel 32a to allow bill 44 to be moved between push plate 37 and back plate 33 from channel 32a in cash box 6. In this condition, when convey motor 50 is rotated in the other direction, rack 38 is downwardly moved, while push plate 37 is moved toward back plate 33 through link mechanism 36, and therefore, push plate 37 can press bill 44 supplied through channel 32a into cash box 6.

Figure 7:
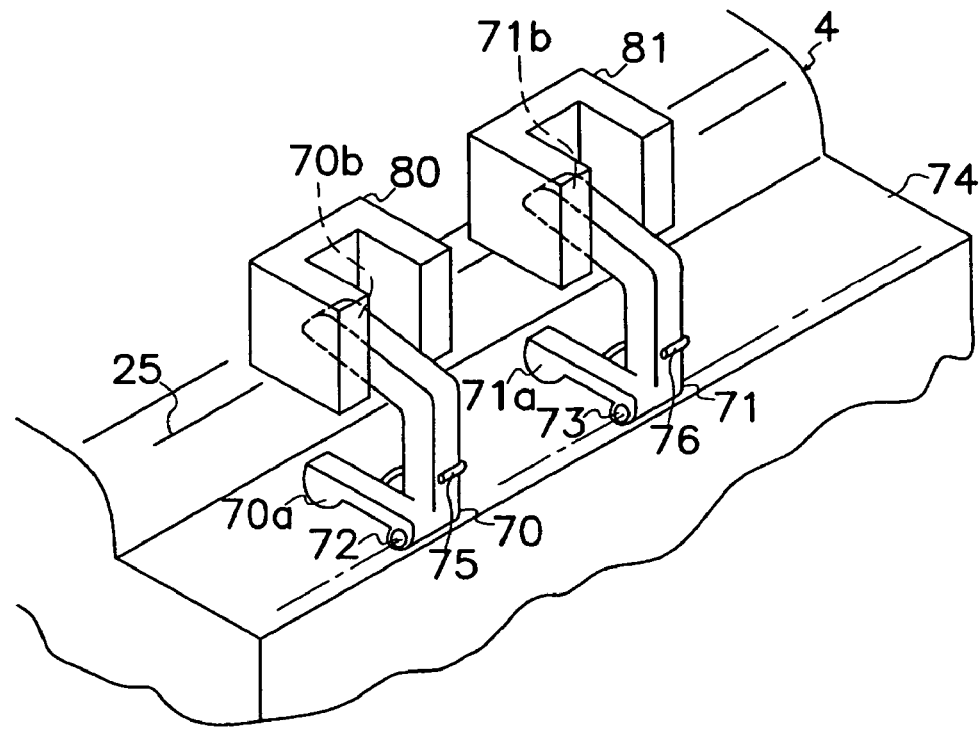
FIG. 7 is a perspective view of attachment and stack levers both in the original position.
Figure 9:
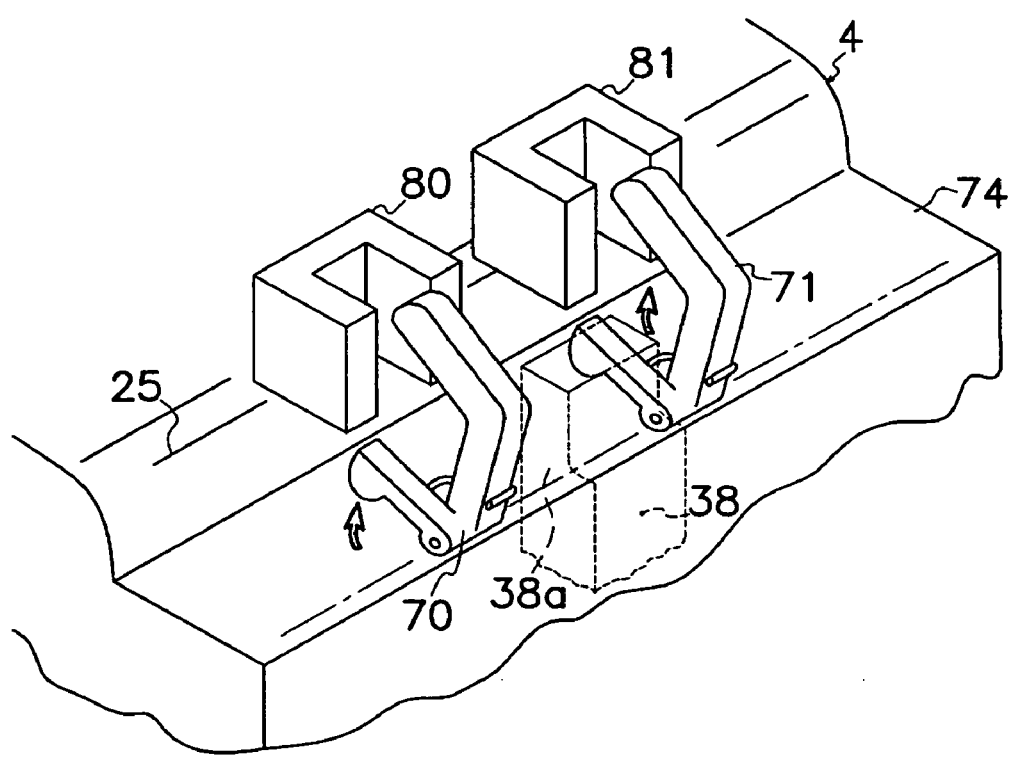
FIG. 9 is a perspective view of the attachment and stack levers both in the operative position.

As shown in FIG. 7, an attachment lever 70 and a stack lever 71 have a generally similar shape, and are rotatably mounted on shafts 72, 73 mounted on frame 25 between the original position shown in FIG. 7 and operative position shown in FIG. 9. Attachment lever 70 has a round end 70a to which a cam portion 74 of stacker 4 may be brought into contact. Stack lever 71 has a round end 71a to which an end 38a of rack 38 may be brought into contact.

Figure 5:
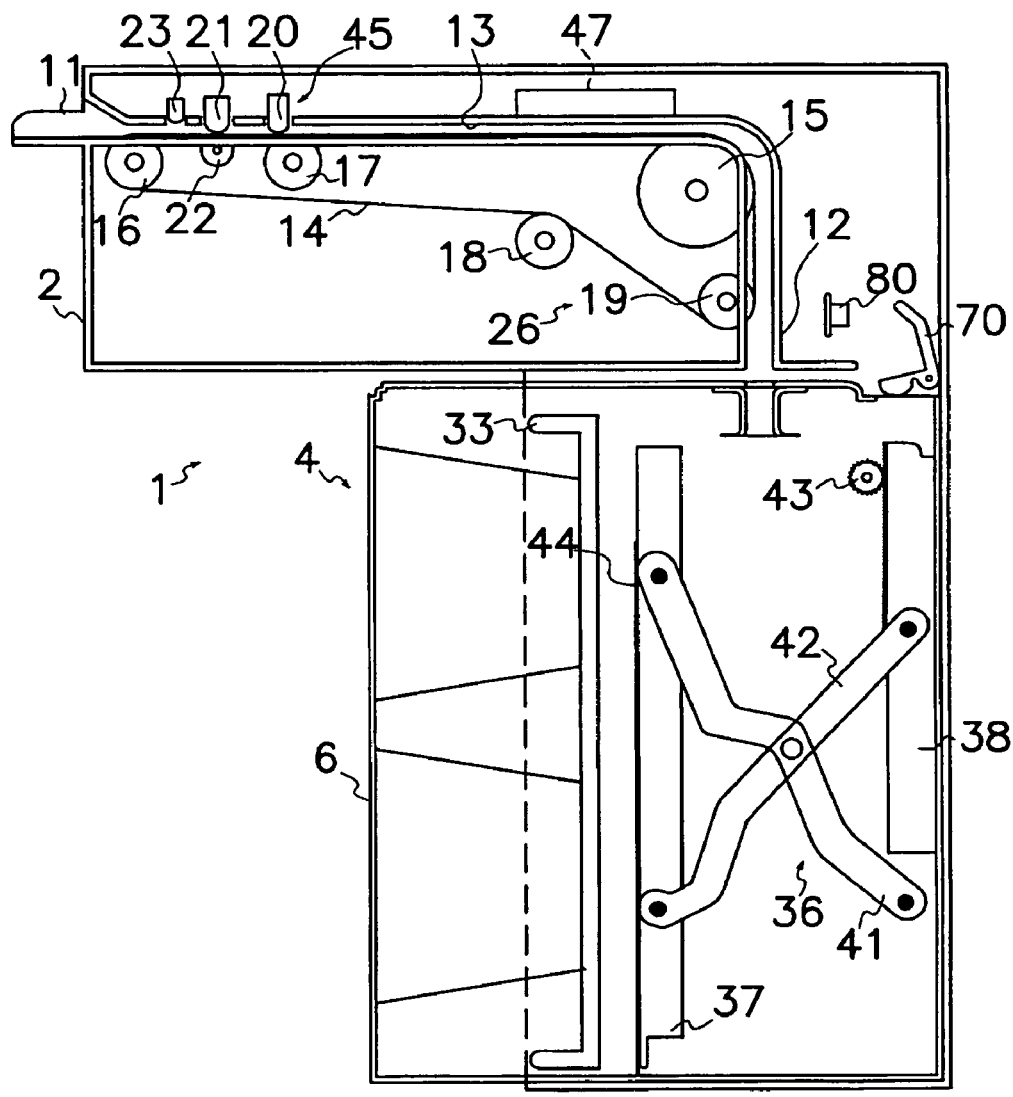
FIG. 5 is a sectional view of the bill handling apparatus with the push plate moved to the stacked position.
Figure 8:
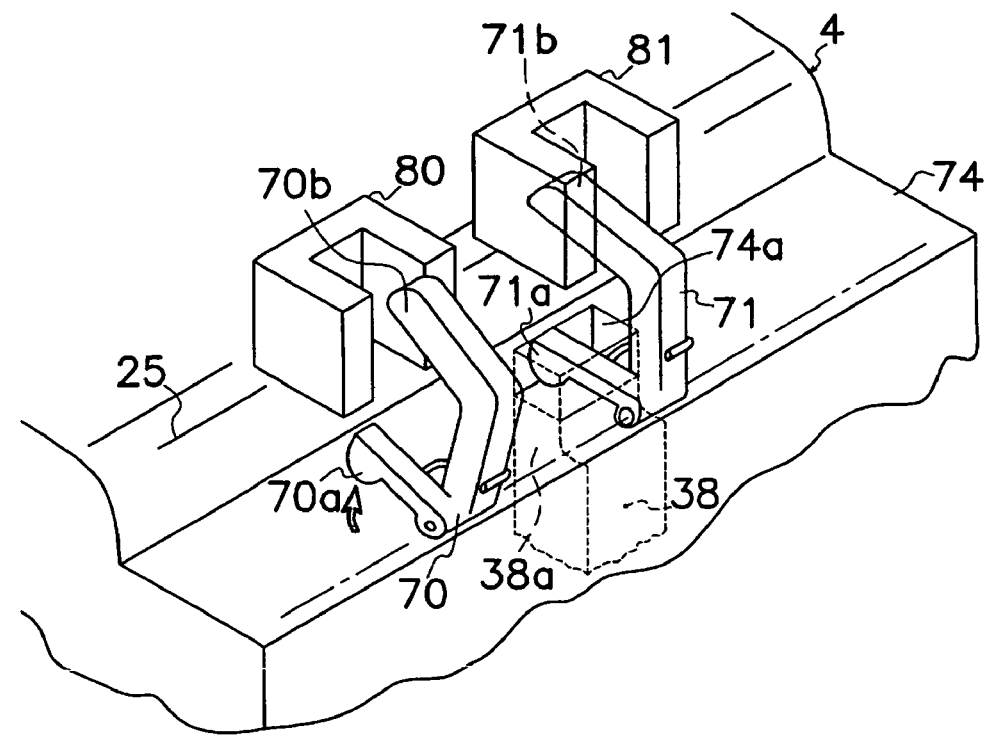
FIG. 8 is a perspective view of the attachment lever in the operative position and the stack lever in the original position.

As shown in FIG. 8, upper end 38a of rack 38 extends through an opening 74a of cam portion 74 to be brought into contact to round end 71a of stack lever 71. Also, attachment lever 70 and stack lever 71 are resiliently urged toward their original positions respectively by springs 75, 76. In the original position, the other end 70b of attachment lever 70 is positioned within an attachment sensor 80 of light emitting diode and light receiving transistor. Also, in the original position, the other end 71b of stack lever 71 is positioned within stack sensor 81 of light emitting diode and light receiving transistor. When stacker 4 is not attached in frame 25, attachment lever 70 is in the original position shown in FIG. 7. When stacker 4 is attached in frame 25 as shown in FIG. 5, cam portion 74 comes into contact to round end 70a of attachment lever 70 to rotate attachment lever 70 in the clockwise direction from the original position of FIG. 7 to the operative position of FIGS. 8 and 9 against resilient force of spring 75 and self-weight of attachment lever 70 so that attachment sensor 80 detects attachment of stacker 4 to validator 2 because the other end 70b of attachment lever 70 is removed from attachment sensor 80.

Push plate 37 is in the blocking position shown in FIG. 1 wherein push plate 37 covers channel 32a of cash box 6 to prevent unauthorized drawing of bill 44 from stacker 4. When rack 38 is moved to the downward position of FIG. 5, push plate 37 presses bill 44 to the stacked position to release the engagement of rack 38 with stack lever 71 that is then returned to the original position of FIG. 6. Adversely, when rack 38 is moved to the upward position, push plate 37 is moved to the acceptant position of FIG. 4 to receive bill 44, rack 38 moves stack lever 71 to the operative position of FIG. 9 against resilient force of spring 76 and own weight of stack lever 71. In lieu of attachment lever 70 and stack lever 71 rotatably mounted on frame 25, other means may be provided for example such as attachment rod and stack rod each slidable on frame 25.

As shown in FIG. 3, in a prior art bill handling apparatus 1, an inlet sensor 23, an optical sensor 20, attachment sensor 80 and stack sensor 81 are connected through an amplifier 48 to input terminals of a control circuit 47 whose output terminal is connected to a motor control circuit 46 for controlling a convey motor 50. Upon insertion of bill 44 into inlet 11, detection sensor 45 detects physical feature, namely optical and magnetic patterns of bill 44 routed to control circuit 47 that validates bill 44 and decides denomination of bill 44 in view of electric signals indicative of physical feature of bill 44. The read data is stored in control circuit 47 as bill information.

When bill 44 is inserted into inlet 11 of validator 2, inlet sensor 23 detects insertion of bill 44 to produce a detection signal to input terminal of control circuit 47 through amplifier 48. At the moment, control circuit 47 forwards a drive signal to motor control circuit 46 of convey device 26 to drive convey motor 50 and drive pulley 15 in the forward direction so that convey belts 14 carries bill 44 inwardly along passageway 13.

Figure 4:
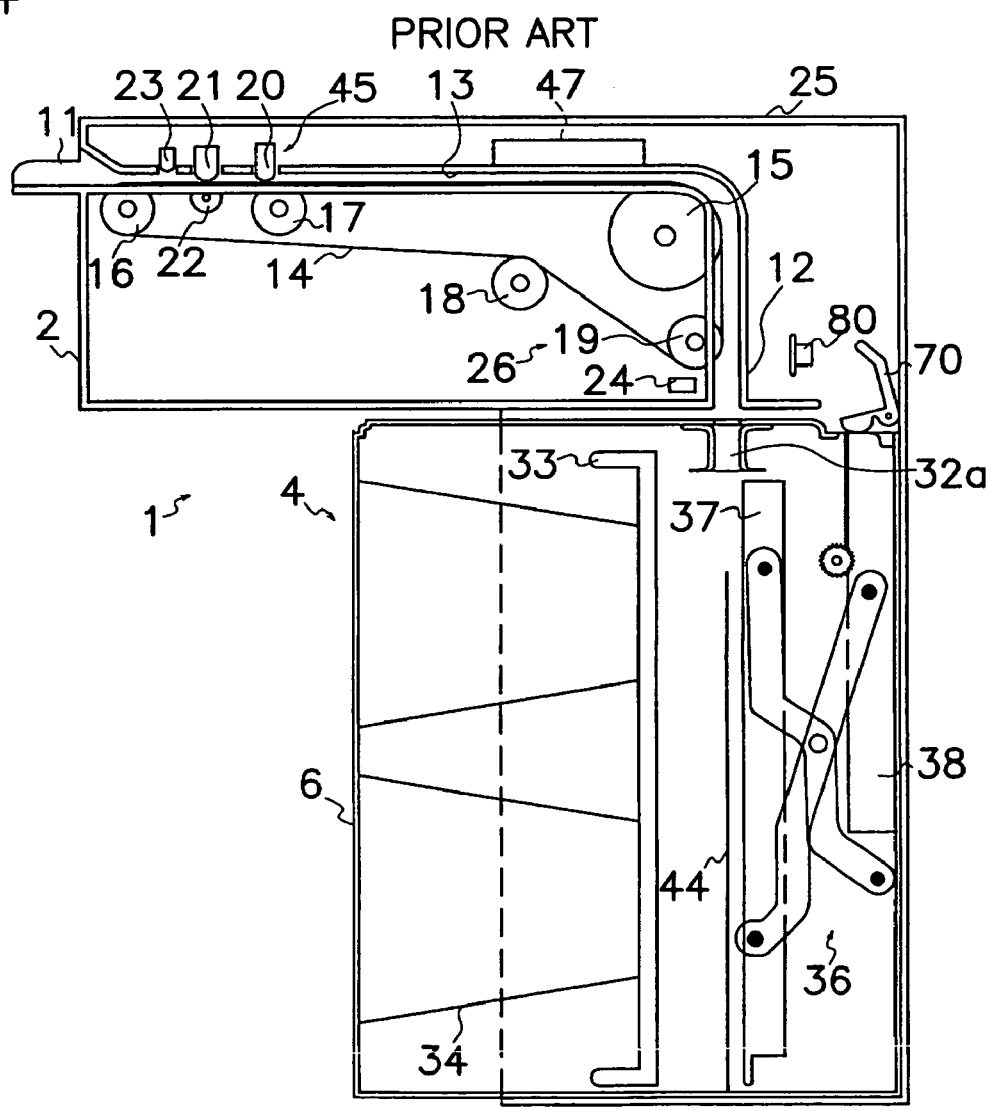
FIG. 4 is a sectional view of the bill handling apparatus with a push plate moved to the acceptant position.

Then, convey motor 5 is rotated in one direction to upwardly move rack 38 as shown in FIG. 4 and simultaneously move push plate 37 from the blocking position to the acceptant position so that bill 44 is carried in the standby position from channel 32a between back plate 33 and push plate 37. Discharge sensor 24 detects arrival of bill 44 at the standby position. Here, when convey motor 50 is rotated in the adverse direction, rack 38 is downwardly moved and bill 44 is pressed into cash box 6 by push plate 37 that is urged toward back plate 33 by link mechanism 36. Stack lever 71 of FIG. 7 automatically detects movement of push plate 37 to certainly and forcibly put bill 44 into cash box 6 by operation of push plate 37 at the accurate timing.

Meanwhile, personnel must collect stackers housed in bill handling apparatuses such as parent gamming machine, for example, a slot machine, keeping sufficient security in cooperation of several people. In this case, while one of them takes stacker 4 out of gamming machine, another should put the taken stacker 4 on a predetermined shelf of a container, and still another staff conveys the container in work allotment. If one of staffs carelessly puts the stacker 4 on a wrong shelf of container, no longer or hardly it is possible to confirm on which gamming machine the stacker 4 is removed from, and therefore, there is a defect that prompt check cannot be made regarding agreement between a total amount of collected bills from stackers 4 and bill's amount recorded through gamming machines.

Figure 10:
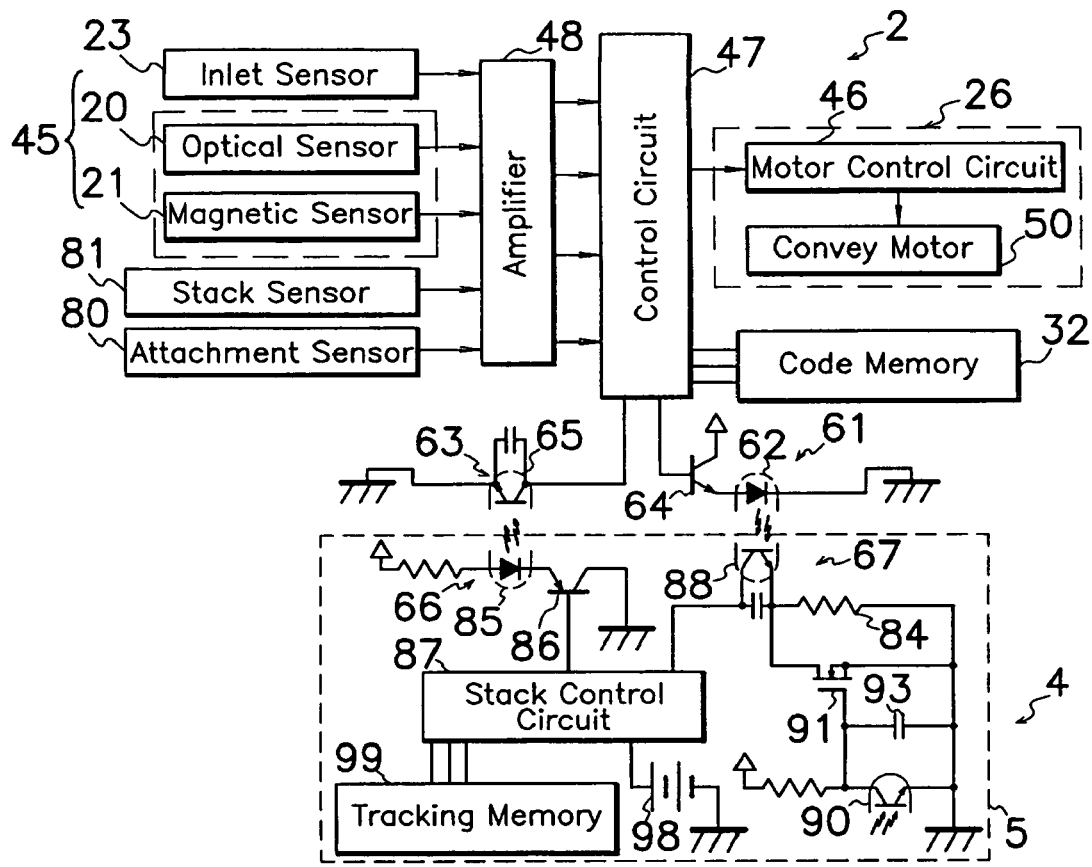
FIG. 10 is an electric circuit of an intelligent cash box according to the present invention through photocoupler communication between a validator and a stacker.

FIG. 10 shows an electric circuit used in a new intelligent cash box system according to the present invention that is provided invalidator 2 and stacker 4 with an intelligent storage 5. In this system, control circuit 47 comprises a code memory 32 as a part thereof, and a validator light emitter 61 and a validator light receiver 63 each connected to control circuit 47. Validator light emitter 61 comprises a transistor 64 as a validator switching element, and a light emitting diode 62 as a validator light emitting element connected to one of main terminals, namely an emitter of transistor 64. A control terminal, namely base of transistor 64 is connected to control circuit 47, and the other of the main terminals, namely a collector is connected to a power source not shown. Validator light emitter 63 comprises a light receiving transistor 65 connected to control circuit 47.

Intelligent storage 5 mounted in stacker 4 comprises a tracking memory 99, a stack light emitter 66, a stack light receiver 67, a stack control circuit 87 connected to tracking memory 99, stack light receiver 66 and stack light emitter 67, and a battery 98 for supplying electric power to each circuit of intelligent storage 5. In this embodiment, tracking memory 99 has computing or calculating means for counting denomination or type and number of bills 44 scanned by detection sensor 45, but control circuit 47 or code memory 32 may have similar computing or calculating means for counting denomination or type and number of bills 44 as required. Tracking memory 99 may be a part of stack control circuit 87.

Stack light emitter 66 comprises a transistor 86 as a stacker switching element, and a light emitting diode 85 as a stacker light emitting element connected to emitter, one of main terminals of transistor 86. Control terminal or base of transistor 86 is connected to stack control circuit 87, and collector or the other of main terminals of transistor 86 is grounded. Stack light receiver 67 comprises a light receiving transistor 88 as a light receiving element, and a resistor 84 for grounding emitter of light receiving transistor 88. Collector of light receiving transistor 88 is connected to stack control circuit 87. Connected in parallel relation to resistor 84 is a field effect transistor (FET) 91 as a gate element whose gate is connected to a capacitor 93 and a light receiving transistor 90 as a noise sensor, and emitter of light receiving transistor 90.

Figure 6:
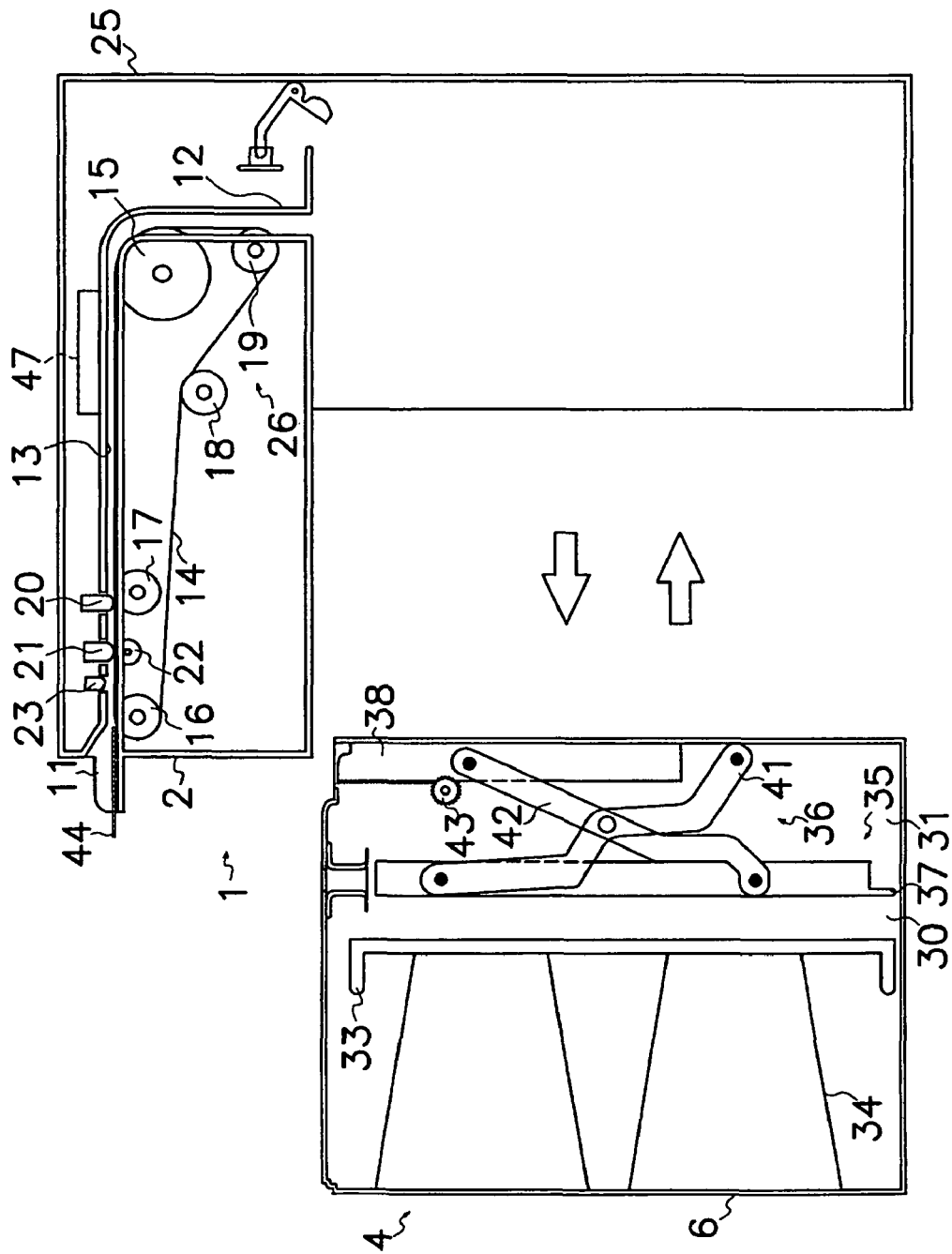
FIG. 6 is a sectional view of the bill handling apparatus with a stacker removed from the apparatus.

When stacker 4 in the separated condition of FIG. 6 is attached to validator 2 as shown in FIG. 4, light emitting diode 62 of validator light emitter 61 is incorporated with light receiving transistor 88 of intelligent storage 5 without contact to each other to form a first photocoupler as shown in FIG. 10. Likewise, light receiving transistor 65 of validator light receiver 63 is incorporated with light emitting diode 85 of intelligent storage 5 without contact to each other to form a second photocoupler. Light receiving transistor 65 receives light pulses indicative of information from light emitting diode 85 to confirm the status of stack control circuit 87 by control circuit 47 for example on whether previous information in tracking memory 99 has been deleted or whether unnecessary information is stored in tracking memory 99.

Figure 11:
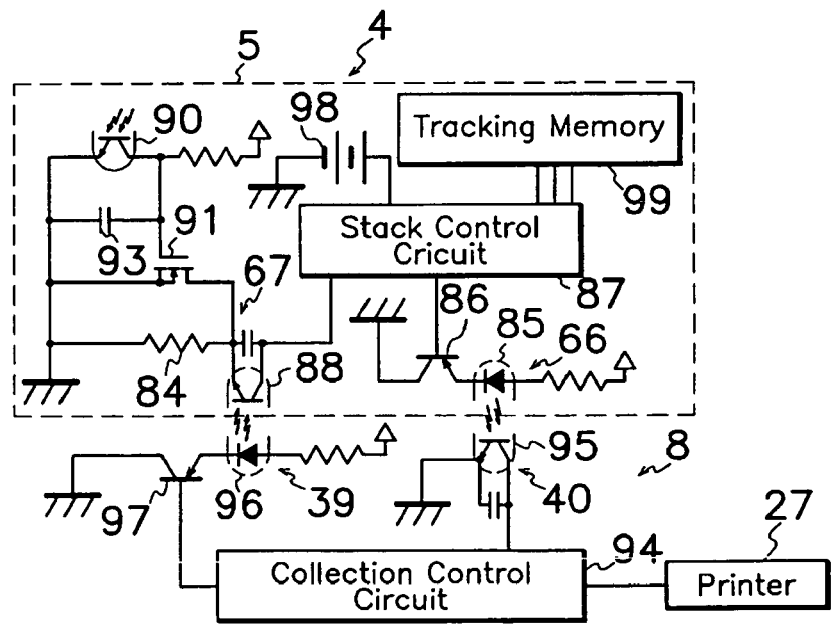
FIG. 11 is an electric circuit of the intelligent cash box according to the present invention through photocoupler communication between the stacker and an information collector.

As shown in FIG. 11, an information collector 8 comprises a collection light emitter 39, a collection light receiver 40, a collection control circuit 94 connected to collection light emitter 39 and collection light receiver 40 at each input terminal, and a printer 27 connected to an output terminal of collection control circuit 94. Collection light emitter 39 comprises a transistor 97 with a control terminal or base connected to collection control circuit 94, and a light emitting diode 96 connected to emitter of transistor 97 whose collector is grounded. Collection light receiver 40 comprises a light receiving transistor 95 connected between collection control circuit 94 and earth or ground. When intelligent storage 5 is positioned in front of information collector 8, as shown in FIG. 11, light receiving transistor 95 of collection light receiver 40 is incorporated with light emitting diode 85 of intelligent storage 5 without contact to each other to form a third photocoupler for transmitting light pulses from stack light emitter 66 to collection light receiver 44. Similarly, light emitting diode 96 of collection light emitter 39 is mated with light receiving transistor 88 of intelligent storage 5 in the non-contact condition to form a fourth photocoupler for transmitting light pulses from collection light emitter 39 to stack light receiver 67. For example, control circuit 47 confirms the status of stack control circuit 87 whether tracking memory 99 contains any information or unnecessary information or whether tracking memory 99 can do its function well.

Figure 15:
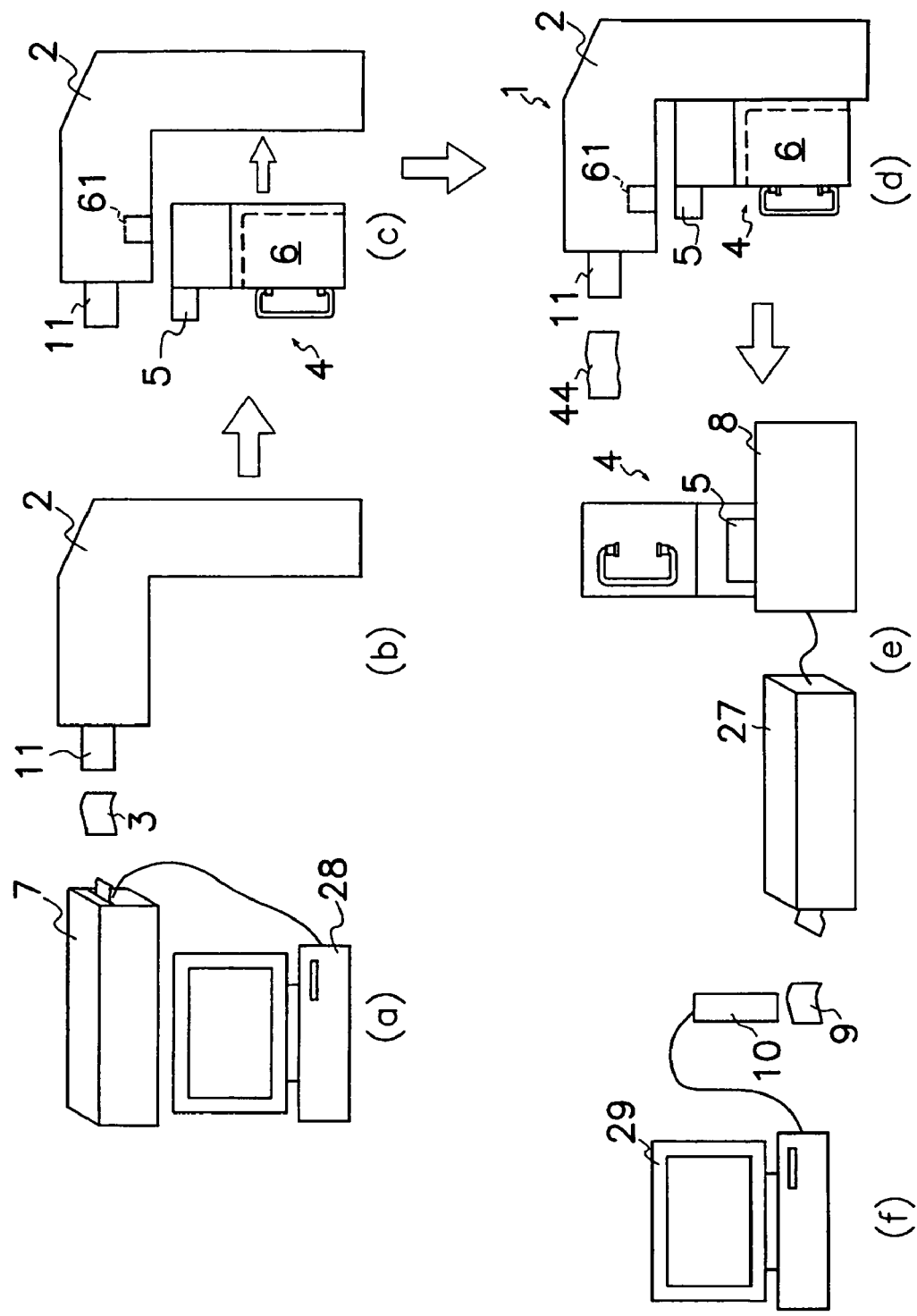
FIG. 15 is a flow chart showing a sequence for collecting bills from the stacker of the bill handling apparatus.

The method for transmitting code information according to the present invention is described hereinafter in connection with FIG. 15. Initially, as shown in FIG. 15 (*a*), a printer 7 is connected to a supervising computer 28 to record a code on a card 3 by printer 7 and issue card 3 from printer 7 so that issued card 3 bears the recorded code for identifying a specific bill handling apparatus, and the code can be optically or magnetically read out by detection sensor 45. For example, the code is recorded with bar codes, symbols, numerals or alphabets on card 3 or by perforating card 3 to form a punch card to denote a machine number for identifying a parent slot machine. Preferably, the recorded code includes invisible, indecipherable or incomprehensible letters, devices, symbols or alphabets. Otherwise, the code can be recorded on card 3 with ferrous ink to magnetically detect the code for example with a magnetic head. In this embodiment, assume an entertainment area equipped with a number of gamming machines that each has a bill handling apparatus with a stacker 4 for accumulating bills 44 to be collected. Each bill handling apparatus should store a code as a supervision number for identifying the gamming machine on which bill handling apparatus is mounted. To this end, supervising computer 28 with printer 7 provides a card issue machine for dispensing cards 3 that bear recorded or printed different codes for identifying the gamming machines or validators 2.

Then, as shown in FIG. 15 (*b*), when issued card 3 is inserted into inlet 11 of validator 2, inlet sensor 23 detects insertion of card 3 to produce a detection signal to control circuit 47 that supplies drive signals to motor control circuit 46. Accordingly, convey motor 50 rotates in the forward direction to inwardly move card 3 along passageway 13 by driving convey belts 14, while detection sensor 45 scans and converts the code on card 3 into electric signals to control circuit 47 to store the code in code memory 32. Then, control circuit 47 provides motor control circuit 46 with reverse drive signals to rotate convey motor 50 in the adverse direction so that card 3 is returned to inlet 11.

Next, as shown in FIG. 15 (*c*), stacker 4 with intelligent storage 5 is attached in position within frame 25 of validator 2 so that attachment lever 70 rotates from the original position of FIG. 7 to the operative position of FIG. 9, and attachment sensor 80 detects installation of stacker 4 to generate a detection signal to control circuit 47.

After control circuit 47 receives the detection signal from attachment sensor 80, control circuit 47 forwards pulse array signals indicative of code data stored in code memory 32 to base of transistor 64 to intermittently drive transistor 64 in the ON-OFF mode. In this case, control circuit 47 receives parallel signals of code information stored in code memory 32, and converts them into series pulse array signals indicated by binary code of "0" and "1" for base of transistor 64. Operation of transistor 64 in the ON-OFF mode causes light emitting diode 62 to blink in accordance with series pulse array signals, and light receiving transistor 88 receives optical pulse signals from light emitting diode 62 and transmits them to stack control circuit 87 that forwards the series signals to tracking memory 99 for storage therein as code information.

After all code information is stored in stack control circuit 87 or tracking memory 99, stack control circuit 87 supplies drive signals to base of transistor 86 to intermittently operate transistor 86 in the ON-OFF mode and thereby cause light emitting diode 85 of intelligent storage 5 to blink in the predetermined mode. Light receiving transistor 65 of validator light receiver 63 receives light signals from light emitting diode 85 and supplies them to control circuit 47 to confirm storage of code information in stack control circuit 87 or tracking memory 99. When light receiving transistor 90 receives disturbing light before attachment of stacker 4 to frame 25, electric current flows through light receiving transistor 90 to reduce gate voltage of FET 91 that is then turned OFF so that pulse array signals are not routed to stack control circuit 87 although light receiving transistor 88 receives light signals from light emitting diode 62. Pulse array signals stored as code information in stack control circuit 87 or tracking memory 99 cannot be decoded unless they are read out through a specific decoding software.

After that, in use of gamming machine, users throw each bill 44 into inlet 11 and detection sensor 45 detects physical feature of bill 44 moving along passageway 13 and forwards it to control circuit 47 that validates authenticity of bill 44. When control circuit 47 decides bill 44 as genuine, bill 44 is accumulated in stacker 4. Control circuit 47 transmits electric signals indicative of denomination or type and value of genuine bill 44 as bill information to tracking memory 99 through stacker control circuit 47 for storage of bill information in tracking memory 99, each time bill 44 is stacked in stacker 4, while computing means in tracking memory 99 calculates total number or total of each denomination of stored bills 44. In this case, similarly to code information, control circuit 47 converts parallel signals of bill information into series pulse array signals indicated by binary code of "0" and "1", and sends them to base of transistor 64. Operation of transistor 64 in the ON-OFF mode causes light emitting diode 62 to blink in accordance with the series pulse array signals, and light receiving transistor 88 receives light signals from light emitting diode 62 and transmits them to stack control circuit 87 and tracking memory 99 for storage therein as bill information.

After all bill information is stored in stack control circuit 87 or tracking memory 99, stack control circuit 87 again supplies drive signals to base of transistor 86 to intermittently operate transistor 86 in the ON-OFF mode and thereby cause light emitting diode 85 of intelligent storage 5 to blink in the predetermined mode so that light receiving transistor 65 of validator light receiver 63 receives light signals from light emitting diode 85 and supplies them to control circuit 47 to confirm storage of bill information in stack control circuit 87 or tracking memory 99. Alternatively, control circuit 47 may transmit code and bill information to stack control circuit 87 or tracking memory 99 for storage of these information therein each time bill 44 is stacked in stacker 4, not when control circuit 47 receives detection signal from attachment sensor 80.

Figure 12:
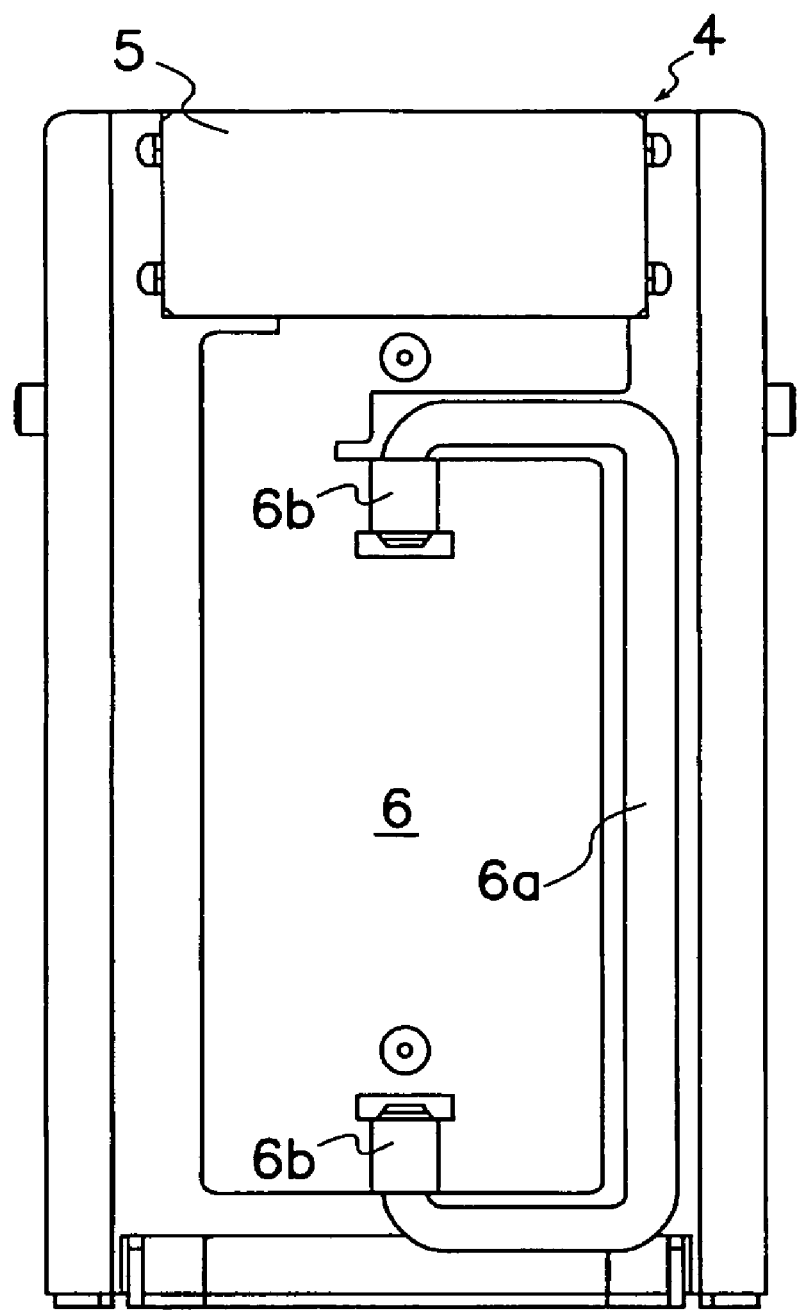
FIG. 12 is a front elevation view of the stacker.
Figure 13:
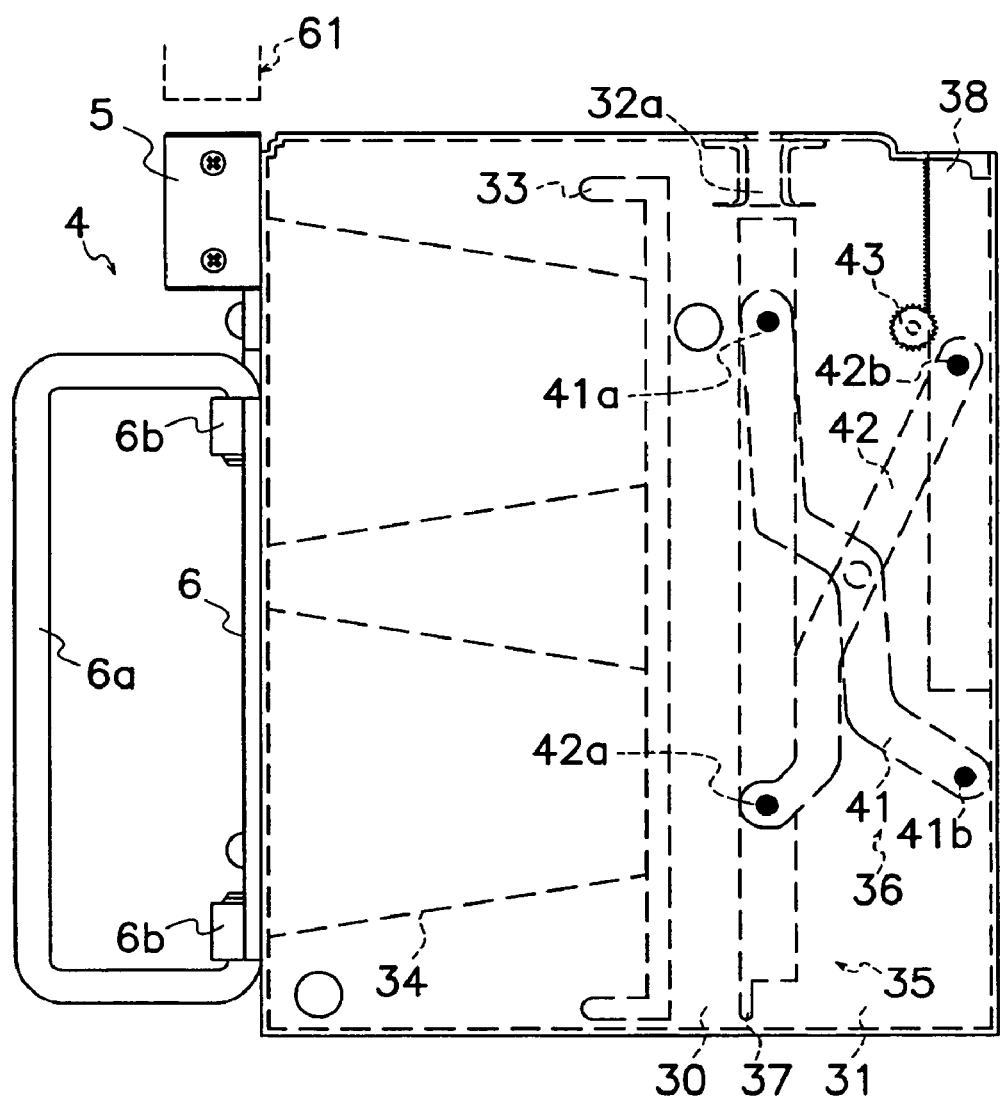
FIG. 13 is a side elevation view of the stacker.
Figure 14:
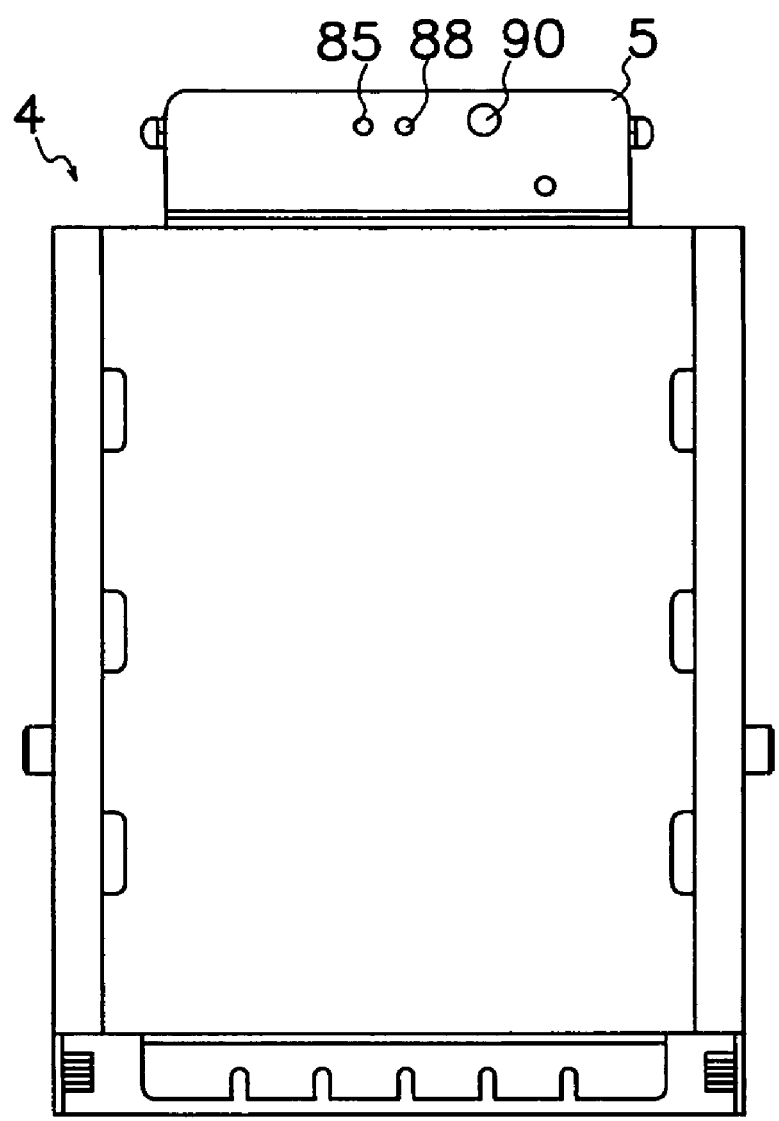
FIG. 14 is a plan view of the stacker.

In collecting bills 44 preserved in stacker 4, an operator opens a door (not shown) of gamming machine, grips and pulls a handle 6a provided on a front surface of intelligent cash box 6 shown in FIGS. 12 and 13 to remove cash box 6 from stacker 4, and take out bills 44 from cash box 6. Handle 6a is rotatably mounted around brackets 6b on cash box 6. Subsequently, as shown in FIG. 15 (e), stacker 4 is turned upside down and put on information collector 8 in position to, as shown in FIG. 11, form the third photocoupler by combination of light receiving transistor 95 of collector light receiver 40 and light emitting diode 85 of intelligent storage 5 and the fourth photocoupler by combination of light emitting diode 96 of collector light emitter 39 and light receiving transistor 88 of intelligent storage 5. Here, when collection control circuit 94 forwards drive signals to base of transistor 97 to cause light emitting diode 96 to flash in the specific ON-OFF mode of coded signals.

Under the condition, light receiving transistor 88 receives light signals from light emitting diode 96 to supply the coded signals to stack control circuit 87 that thereby provides base of transistor 86 with drive signals to drive transistor 86 in the ON-OFF mode to transmit code and bill information stored in tracking memory 99 to collection control circuit 94. In response to operation of transistor 86, light emitting diode 85 flashes to generate light signals that are received by light receiving transistor 95. Thus, collection control circuit 94 provides printer 27 with code information for identifying the gamming machine and bill information for indicating denomination or type and value of bills to record these information on sheet 9 by printer 27.

As shown in FIG. 15 (f), data printed on sheet 9 is then optically read by a scanner 10, and forwarded from scanner 10 to a confirmative computer 29. In this case, when bill information indicated on display of confirmative computer 29 corresponds to the number and denomination or type of bills 44 collected from cash box 6 as mentioned above, the data is stored in confirmative computer 29 for supervision. Then, data stored in tracking memory 99 of stacker 4 is deleted when information collector 8 finishes reading out data from tracking memory 99, when a reset switch (not shown) in stacker is operated or when light receiving transistor 88 receives light signals from light emitting diode 62 after stacker 4 is attached to frame 25 for reuse of stacker 4, or in one of other cases. Without printing the information by printer 27, information collector 8 may directly be connected to confirmative computer 29 via conducting wires to directly supply the information to confirmative computer 29 for input or printing.

The embodiments according to the present invention can produce the following advantages utilizing card 3 bearing code information:

[1] Code information received by information collector 8 serves to promptly and exactly identify the bill handling apparatus 1 from which stacker 4 is removed.

[2] Bill handling apparatus 1 may have the simplified structure of electric circuits because there is no need for connecting control circuit 47 on line with supervising computer because validator 2 detects code information indicated on card 3 for identifying bill handling apparatus and store the information.

[3] Bill handling apparatus 1 or validator 2 does not require any additional hardware to receive code information because a common detection sensor 45 can be used to discern bill's physical property and code recorded on card 3 and to store the code in stacker 4.

[4] Prompt and accurate check can be made between collected bills and bill information stored in stacker 4.

[5] Code information for identifying bill handling apparatus 1 can easily be changed by inserting a card 3 of a different code into validator 2 for storage of the code information.

[6] A code different from manufacture number of parent machine or bill handling apparatus can be recorded on card 3.

Moreover, the embodiments of the present invention can present the following advantages utilizing photocouplers:

[1] There is no need of electric connection with jacks and plugs between validator 2 and stacker 4 and between stacker 4 and information collector 8, and stacker 4 can easily be attached to validator 2 and information collector 8.

[2] Non-contact transmission of bill information and code information can be made between validator 2 and stacker 4 and between stacker 4 and information collector 8 avoiding mechanical contact failure and damage from external electric impact.

[3] Two way communication by a pair of photocouplers between validator 2 and stacker 4 and between stacker 4 and information collector 8 enables confirmation of failure of a mated device.

[4] Stacker 4 can be moved and attached to validator 2 together with intelligent storage 5.

[5] Stacker 4 can be compatible for reuse by erasing information in tracking memory 99.

[6] Tracking memory 99 always stores data of current or updated amount of bills in stacker 4 because bill information is stored in real time in tracking memory 99 each time bill 44 is pressed into stacker 4.

[7] No information can be read out from tracking memory 99 without photocouplers conforming to stacker 4 and exclusive software applied to information collector 8 for decoding pulse array signals from stacker 4, for improved security and prevention of unauthorized information retrieval.

[8] Tracking memory 99 has the function for storing, adding and computing bill information.

The foregoing embodiment shows an example of the present invention applied to a bill handling apparatus of gamming machine such as slot machine, however, it should be understood that the present invention also can be applied to cash dispensers, vending machines, exchangers or other bill handling machines installed in banks, amusement facilities or other transaction areas. Also, in lieu of bills, coupons, scrip, tokens may be used to validate and stack them and store the amount or total amount of them in a similar method.

What is claimed are:

1. An intelligent cash box system comprising:
    validating means attached in a bill handling apparatus,
    stacking means detachably attached to said validating means for accumulating bills considered as genuine by said validating means,
    an intelligent storage provided in the stacking means, and
    a card bearing at least a code recorded on said card for identifying said bill handling apparatus,
    said validating means comprising: sensing means for optically or magnetically detecting either of the code on said card and a physical feature of the bill respectively as code information and bill information when said card or bill is inserted into said validating means, and
    control means for receiving said code and bill information from said sensing means,
    wherein said control means forwards the received code and bill information to said intelligent storage in a non-contact condition relative to said control means to store the code and bill information in said intelligent storage.

2. The intelligent cash box system of claim 1, wherein said validating means validates authenticity of the inserted bills based on the bill information from said sensor means;
    the bill information includes data of the bills accumulated in a storage chamber of said stacking means.

3. The intelligent cash box system of claim 1, wherein said validating means comprises conveying means for transporting the card and bill inserted into an inlet of said validating means along a passageway,
    said sensing means optically or magnetically detects the code on the card and the physical feature of the transported bill to produce electric signals indicative of the code and bill information,
    said control means attests the bill based on output signals of said sensing means and also forwards drive signals to said conveying means;
    said stacking means comprises a storage chamber for receiving and accumulating the bills considered genuine by the control means and transported by the conveying means through the passageway to the storage chamber.

4. The intelligent cash box system of claim 1, wherein said stacking means comprises an intelligent cash box provided with said storage chamber and a housing,
    said housing receives a pusher for pressing the supplied bill into said intelligent cash box, and
    said intelligent storage is attached outside said storage chamber.

5. The intelligent cash box system of claim 1, wherein said control means comprises a code memory for storing the code information, and
    said intelligent storage comprises a tracking memory for storing the code and bill information.

6. The intelligent cash box system of claim 1, further comprising information collecting means provided independently from said validating means for receiving said code and bill information from the intelligent storage of said stacking means removed from said validating means.

7. The intelligent cash box system of claim 1, further comprising a card issue machine for recording the code on said card and issuing said card.

8. The intelligent cash box system of claim 1, wherein at least one of said control means and intelligent storage comprises computing means for calculating the number and kind or denomination of the bills detected by said sensing means.

9. The intelligent cash box system of claim 7, wherein said card issue machine prints or records on said card the code selected from the groups consisting of bar codes, symbols, numerals or alphabets or makes perforates to form a punch card, or mixtures thereof.

10. The intelligent cash box system of claim 1, further comprising photocoupler means provided between said control means and intelligent storage for transmitting the code and bill information from said control means to said intelligent storage in the non-contact condition of said control means and said intelligent storage.

11. The intelligent cash box system of claim 6, further comprising photocoupler means provided in a non-contact condition between said intelligent storage and a collection control circuit in said information collecting means to transmit the code and bill information from said intelligent storage to said collection control circuit through said photocoupler means.

12. The intelligent cash box system of claim 1, wherein said validating means comprises a validator light emitter connected to said control means,
said intelligent storage comprises a stack control circuit and a stack light receiver connected to said stack control circuit,
said stack light receiver is located opposite to and in spaced relation to said validator light emitter to transmit light signals indicative of the code and bill information from said control means to said stack control circuit through said validator light emitter and stack light receiver.

13. The intelligent cash box system of claim 1, wherein said validating means comprises a validator light receiver connected to said control means,
said intelligent storage comprises a stack control circuit and a stack light emitter connected to said stack control circuit,
said stack light emitter is located opposite to and in spaced relation to said validator light receiver to transmit light signals from said stack control circuit to said control means through said stack light emitter and validator light receiver and confirm a condition of said stack control circuit by said control means.

14. The intelligent cash box system of claim 12, wherein said intelligent storage comprises a noise sensor for detecting disturbing light, and a gate element connected to said stack light receiver,
wherein said gate element is turned off to restrict electric current flowing through said stack light receiver when said noise sensor detects disturbing light.

15. The intelligent cash box system of claim 11, wherein said information collecting means comprises a collection light receiver connected to said collection control circuit,
said collection light receiver is located opposite to and in spaced relation to a stack light emitter of said intelligent storage to transmit the code and bill information from said intelligent storage to said collection control circuit through said stack light emitter and collection light receiver.

16. The intelligent cash box system of claim 11, wherein said information collecting means comprises a collector light emitter connected to said collection control circuit,
said collector light emitter is located opposite to and in spaced relation to a stack light receiver of said intelligent storage to transmit light signals from said collection control circuit to said intelligent storage through said collector light emitter and stack light receiver and confirm a condition of said collection control circuit by said stack control circuit.

17. The intelligent cash box system of claim 1, further comprising an attachment sensor in said validating means for detecting attachment of said stacking means to said validating means to produce a detection signal.

18. The intelligent cash box system of claim 12, wherein said control means receives the detection signal from said attachment sensor,
said stack control circuit receives the code and bill information from said control means through said validator light emitter and stack light receiver.

19. A method for transmitting information on bills comprising the steps of:
inserting a card bearing a code for identifying a bill handling apparatus into an inlet of validating means,
conveying the card along a passageway in said validating means,
optically or magnetically detecting the code on said card by sensing means that forwards the code to control means in said validating means as code information,
detachably attaching to a bill handling apparatus stacking means provided with an intelligent storage in a non-contact condition relative to said control means,
forwarding the code information from said control means to said intelligent storage in the non-contact condition relative to said control means to store the code information in said intelligent storage,
inserting a bill into the inlet of said validating means,
conveying the bill along said passageway in said validating means,
optically or magnetically detecting a physical feature of the bill moving along said passageway to attest the authenticity of the bill by said control means,
conveying the bill considered to be genuine by said validating means to said stacking means to preserve the bill in said stacking means; and
forwarding the bill information from said control means to said intelligent storage in the non-contact condition relative to said control means to store the bill information in said intelligent storage.

20. The method of claim 19, further comprising transmitting the code and bill information from said intelligent storage to information collecting means.

21. The method of claim 19, further comprising: recording on said card a code for identifying the bill handling apparatus; and
issuing the card from a card issue machine for insertion of said card into the inlet of said validating means of said bill handling apparatus.

22. The method of claim 19, further forwarding the bill information from said control means to said intelligent storage, each time the stacking means preserves a bill therein, said bill information including type, denomination and value of the bill considered genuine.

23. The method of claim 19, further comprising: computing and storing in said intelligent storage the denomination and total number or total amount of bills preserved in said stacking means.

24. The method of claim 19, further comprising: removing said stacking means from said validating means;
collecting the bills from said stacking means;
communicating said intelligent storage with a collection control circuit of information collecting means to transmit the code and bill information from said intelligent storage to said collection control circuit.

25. The method of claim 20, further comprising deleting the code and bill information stored in said intelligent storage after reading out these information to
said information collecting means.

26. The method of claim 19, further forwarding the code information from said control means to said intelligent storage through photocoupler means to store the code information in said intelligent storage, and
forwarding the bill information from said control means to said intelligent storage through said photocoupler means to store the bill information in said intelligent storage.

27. The method of claim 19, further transmitting the code and bill information from said intelligent storage to information collecting means through photocoupler means.

* * * * *